US009674527B2

(12) United States Patent
Seregin et al.

(10) Patent No.: US 9,674,527 B2
(45) Date of Patent: Jun. 6, 2017

(54) IMPLICIT DERIVATION OF PARALLEL MOTION ESTIMATION RANGE SIZE

(71) Applicant: QUALCOMM Incorporated, San Diego, CA (US)

(72) Inventors: Vadim Seregin, San Diego, CA (US); Xianglin Wang, San Diego, CA (US); Jianle Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 510 days.

(21) Appl. No.: 13/746,148

(22) Filed: Jan. 21, 2013

(65) Prior Publication Data

US 2013/0195189 A1  Aug. 1, 2013

Related U.S. Application Data

(60) Provisional application No. 61/593,169, filed on Jan. 31, 2012.

(51) Int. Cl.
*H04N 7/26* (2006.01)
*H04N 19/51* (2014.01)
*H04N 19/105* (2014.01)
*H04N 19/52* (2014.01)
*H04N 19/147* (2014.01)
(Continued)

(52) U.S. Cl.
CPC ..... *H04N 19/00587* (2013.01); *H04N 19/105* (2014.11); *H04N 19/147* (2014.11); *H04N 19/436* (2014.11); *H04N 19/52* (2014.11); *H04N 19/543* (2014.11)

(58) Field of Classification Search
None
See application file for complete search history.

(56) References Cited

U.S. PATENT DOCUMENTS

| 2004/0008779 A1 | 1/2004 | Lai et al. |
| 2008/0126278 A1 | 5/2008 | Bronstein et al. |

(Continued)

FOREIGN PATENT DOCUMENTS

| CN | 102263947 A | 11/2011 |
| WO | 03107679 | 12/2003 |
| WO | 2006028088 A1 | 3/2006 |

OTHER PUBLICATIONS

Jeon et al.: "NON-CE9: Improvement on Parallelized Merge/Skip Mode", 7. JCT-VC Meeting; 98. MPEG Meeting; Nov. 21, 2011-Nov. 30, 2011; Geneva; Nov. 8, 2011.*

(Continued)

*Primary Examiner* — Jorge L Ortiz Criado
*Assistant Examiner* — Stefan Gadomski

(57) ABSTRACT

The method may comprise receiving an indication of a size of a parallel motion estimation (PME) area, performing a motion vector prediction process on coding units having a size smaller than or equal to the PME area using a PME style candidate list construction process and the PME area, deriving an implicit PME area for coding units having a size larger than the PME area, and performing the motion vector prediction process on coding units having the size larger than the PME area using the PME style candidate list construction process and the implicit PME area.

40 Claims, 9 Drawing Sheets

(51) Int. Cl.
*H04N 19/436* (2014.01)
*H04N 19/543* (2014.01)

(56) References Cited

U.S. PATENT DOCUMENTS

| | | | |
|---|---|---|---|
| 2009/0268821 A1 | 10/2009 | Au et al. | |
| 2009/0304084 A1 | 12/2009 | Hallapuro et al. | |
| 2011/0051811 A1 | 3/2011 | Wang et al. | |
| 2012/0230408 A1 | 9/2012 | Zhou | |
| 2012/0236942 A1* | 9/2012 | Lin | H04N 19/52 375/240.16 |
| 2012/0257678 A1 | 10/2012 | Zhou et al. | |
| 2012/0320984 A1* | 12/2012 | Zhou | H04N 19/50 375/240.16 |
| 2014/0301461 A1* | 10/2014 | Jeon | H04N 19/00678 375/240.12 |
| 2015/0237370 A1* | 8/2015 | Zhou | H04N 19/56 375/240.16 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803d2, Torino, IT, Jul. 14-22, 2011, 226 pp.
Bross et al., "WD5: Working Draft 5 of High-Efficiency Video Coding," 7th Meeting: Geneva, Switzerland, Nov. 2011, JCTVC-G1103d2, 214 pp.
Bross et al., "High efficiency video coding (HEVC) text specification draft 6," 7th Meeting: Geneva, CH, Nov. 21-30, 2011, JCTVC-H1003, 259 pp.
Bross et al., "High efficiency video coding (HEVC) text specification draft 7," 9th Meeting: Geneva, CH, Apr. 27-May 7, 2012, JCTVC-I1003d21, 290 pp.
Bross et al., "High efficiency video coding (HEVC) text specification draft 8," 10th Meeting: Stockholm, SE, Jul. 11-20, 2012, JCTVC-J1003d7, 261 pp.
Bross et al., "High efficiency video coding (HEVC) text specification draft 9," 11th Meeting: Shanghai, CH, Oct. 10-19, 2012, JCTVC-K1003v7, 290 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Bross et al., "High efficiency video coding (HEVC) text specification draft 10 (for FDIS & Last Call)," 10th Meeting: Geneva, CH, Jan. 14-23, 2013, JCTVC-L1003v34, 310 pp.
Bross et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.
International Preliminary Report on Patentability from International Application No. PCT/US2013/022557, dated Apr. 7, 2014, 10 pp.
International Search Report and Written Opinion from International Application No. PCT/US2013/022557, dated Apr. 18, 2013, 16 pp.
Jeon et al., "AHG10: Unified design on parallel merge/skip," JCT-VC Meeting; MPEG Meeting; Feb. 1-10, 2012; San Jose, CA (Joint Collaborative Team on Video Coding of ITU-T SG16 WP3 and ISO/IEC JTC1/SC29/WG11); No. JCTVC-H0090, XP030111117, 10 pp.
Jeon et al., "Non-CE9: Removing PU dependency in TMVP reference index derivation," JCT-VC Meeting; MPEG Meeting; Feb. 1-10, 2012; San Jose, CA; (Joint Collaborative Team on Video Coding of ITU-T SG16 WP3 and ISO/IEC JTC1/SC29/WG11); No. JCTVC-H0092, XP030111119, 7 pp.
Kim et al., "AHG10: Unified design on parallel merge/skip with reduced candidates," JCT-VC Meeting; MPEG Meeting; Feb. 1-10, 2012; San Jose, CA; (Joint Collaborative Team on Video Coding of ITU-T SG16 WP3 and ISO/IEC JTC1/SC29/WG11); No. JCTVC-H0247, XP030111274, 7 pp.
Kim et al., "CU-based Merge Candidate List Construction," Joint Collaborative Team on Video Coding (JCT-VC) of ITU-T SG16 WP3 and ISO/IEC JTC1/SC29/WG11, 7th Meeting: Geneva, CH, No. JCTVC-G416, Nov. 8, 2011, XP030110400, 13 pp.
Kim et al., "Non-CE9: Throughput improvement for merge/skip mode," JCT-VC Meeting; MPEG Meeting; Feb. 1-10, 2012; San Jose, CA; (Joint Collaborative Team on Video Coding of ITU-T SG16 WP3 and ISO/IEC JTC1/SC29/WG11); No. JCTVC-H0240, XP030111267, 5 pp.
Zhou et al., "Parallelized merge/skip mode for HEVC," 6, JCT-VC Meeting, 97, MPEG Meeting; Jul. 14, 2011-Jul. 22, 2011; Torino, IT; (Joint Collaborative Team on Video Coding of ITU-T SG16 WP3 and ISO/IEC JTC1/SC29/WG11); <URL: http://wftp3.itu.int/av-arch/jctvc-site/,, No. JCTVC-F069, Jul. 1, 2011 (Jul. 1, 2011), XP030009092.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
Second Written Opinion from International Application No. PCT/US2013/022557, dated Jan. 16, 2014, 6 pp.
Zhou et al., "AHG10: Configurable and CU-group level parallel merge/skip," JCT-VC Meeting, Document JCTVC-H0082, Jan. 2-10, 2012, 13 pp.

* cited by examiner

IMPLICIT DERIVATION OF PARALLEL MOTION ESTIMATION RANGE SIZE

RELATED APPLICATIONS

This application claims the benefit of U.S. Provisional Application No. 61/593,169, filed Jan. 31, 2012, the entire content of which is incorporated by reference herein.

TECHNICAL FIELD

This disclosure relates to video coding, and more particularly to techniques for motion prediction and parallel coding in a video coding process.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction utilizes a predictive block. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for video coding, and more particularly to techniques for motion estimation in a video coding process. The techniques may utilize signaling of a size associated with a motion estimation area, and may perform motion vector prediction on coding units having sizes smaller than or equal to the signaled size of the motion estimation area. The techniques may also involve the derivation of an implicit motion estimation area for coding units that have sizes larger than the signaled size of the motion estimation area.

In one example of the disclosure, a method for decoding video data comprises receiving an indication of a size of a parallel motion estimation (PME) area, performing a motion vector prediction process on coding units having a size smaller than or equal to the PME area using a PME style candidate list construction process and the PME area, deriving an implicit PME area for coding units having a size larger than the PME area, and performing the motion vector prediction process on coding units having the size larger than the PME area using the PME style candidate list construction process and the implicit PME area.

In another example of the disclosure, a method for encoding video data comprises performing a motion vector prediction process on coding units having a size smaller than or equal to a PME area using a PME style candidate list construction process and the PME area, performing the motion vector prediction process on coding units having the size larger than the PME area using the PME style candidate list construction process and an implicit PME area, and signaling an indication of a size of the PME area.

In another example of the disclosure, an apparatus configured to decode video data comprises a video decoder configured to receive an indication of a size of a PME area, perform a motion vector prediction process on coding units having a size smaller than or equal to the PME area using a PME style candidate list construction process and the PME area, derive an implicit PME area for coding units having a size larger than the PME area, and perform the motion vector prediction process on coding units having the size larger than the PME area using the PME style candidate list construction process and the implicit PME area.

In another example of the disclosure, an apparatus configured to encode video data comprises a video encoder configured to perform a motion vector prediction process on coding units having a size smaller than or equal to a PME area using a PME style candidate list construction process and the PME area, perform the motion vector prediction process on coding units having the size larger than the PME area using the PME style candidate list construction process and an implicit PME area, and signal an indication of a size of the PME area.

In another example of the disclosure, an apparatus configured to encode video data comprises means for receiving an indication of a size of a PME area, means for performing a motion vector prediction process on coding units having a size smaller than or equal to the PME area using a PME style candidate list construction process and the PME area, means for deriving an implicit PME area for coding units having a size larger than the PME area, and means for performing the motion vector prediction process on coding units having the size larger than the PME area using the PME style candidate list construction process and the implicit PME area.

In another example of the disclosure, an apparatus configured to encode video data comprises means for performing a motion vector prediction process on coding units having a size smaller than or equal to a PME area using a PME style candidate list construction process and the PME area, means for performing the motion vector prediction process on coding units having the size larger than the PME area using the PME style candidate list construction process and an implicit PME area, and means for signaling an indication of a size of the PME area.

In another example of the disclosure, a computer-readable storage medium stores instructions that, when executed, cause on or more processors of a device configured to decode video data to receive an indication of a size of a PME area, perform a motion vector prediction process on coding units having a size smaller than or equal to the PME area using a PME style candidate list construction process and the PME area, derive an implicit PME area for coding units having a size larger than the PME area, and perform the motion vector prediction process on coding units having the size larger than the PME area using the PME style candidate list construction process and the implicit PME area.

In another example of the disclosure, a computer-readable storage medium stores instructions that, when executed, cause on or more processors of a device configured to encode video data to perform a motion vector prediction process on coding units having a size smaller than or equal to a PME area using a PME style candidate list construction process and the PME area, perform the motion vector prediction process on coding units having the size larger than the PME area using the PME style candidate list construction process and an implicit PME area, and signal an indication of a size of the PME area.

The details of one or more examples are set forth in the accompanying drawings and the description below. Other features, objects, and advantages will be apparent from the description and drawings, and from the claims.

DETAILED DESCRIPTION

Recent proposals for the High Efficiency Video Coding (HEVC) standard include parallel motion estimation (PME). With PME, motion information is performed in parallel for some or all blocks (e.g., coding units) within a specified PME area (e.g., a PME area defined by a signaled syntax element). Motion information may include a motion vector, reference index, and a prediction direction. In many cases, motion information is decoded using a motion vector prediction process.

A motion vector prediction process typically uses decoded motion information of neighboring blocks to derive the motion information for a current block. However, if the neighboring blocks are in the same PME area, no motion information would be available, as motion information is performed in parallel for these blocks. Because of this feature of PME, special rules are applied for performing motion vector prediction in for blocks in a PME area. In particular, a special candidate list construction process would be used, where neighbor blocks within the same PME area as the coded blocks cannot be used as candidate blocks in the motion vector prediction process.

However, not all blocks in a picture would fall in a PME area. For example, motion information for blocks that are larger than the PME area would not be decoded in parallel with other blocks. In this circumstance, no restrictions on neighbor blocks would be applied for the candidate list construction for a block larger than the PME area.

In summary, with PME concepts enabled, two different modes for candidate list construction are used. A decoder compatible with PME may be configured to support both modes, thus causing a potential increase in implementation complexity. In view of this drawback, this disclosure presents techniques for coding motion vectors for PME enabled video coders that may moderate or reduce the implementation complexity. The techniques include the implicit derivation of PME size for blocks larger than a signaled PME area, and the application of "PME style" candidate list construction for blocks where a PME size is implicitly derived. The techniques of this disclosure will be described in more detail below.

Figure 1:
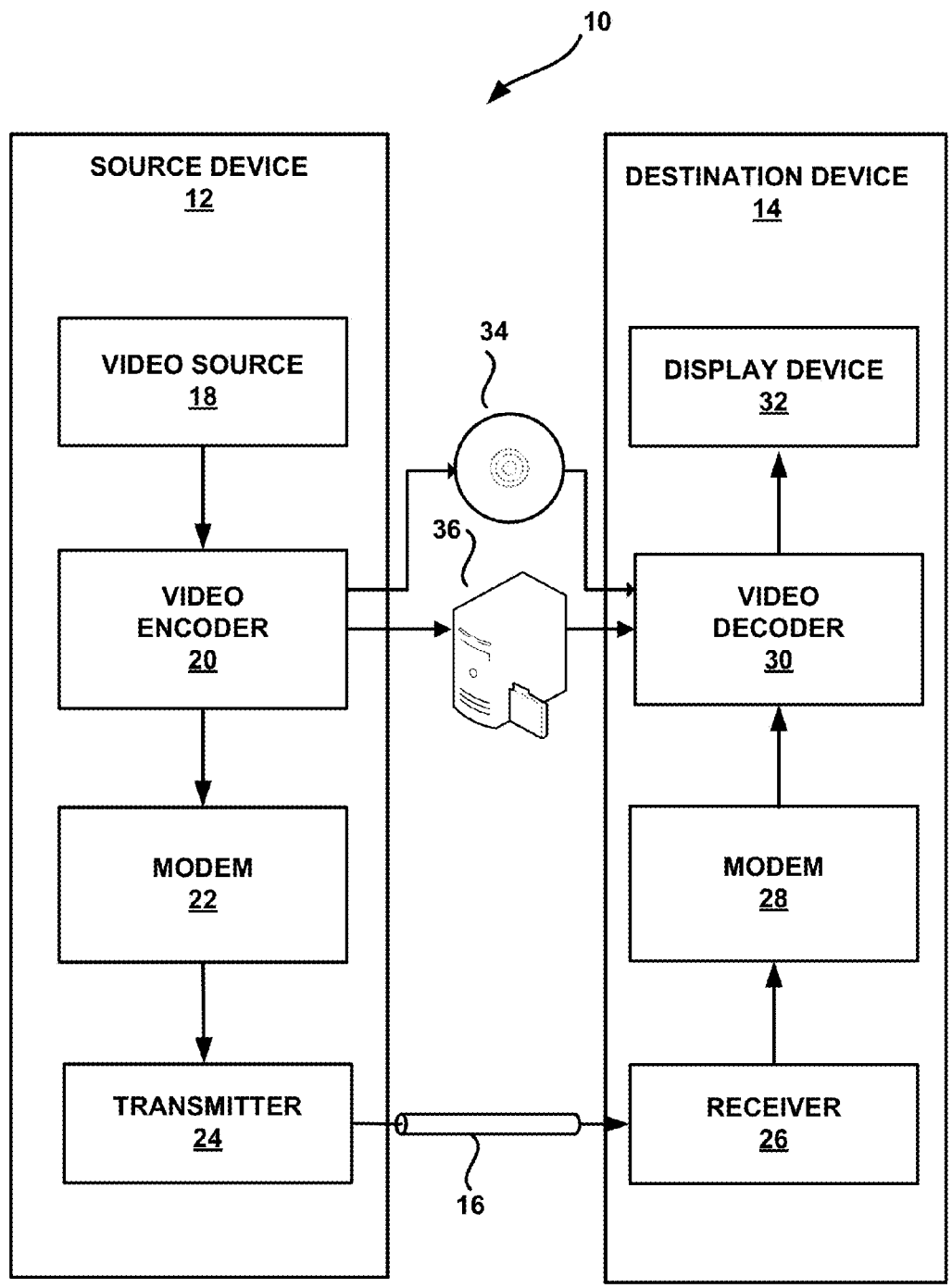
FIG. 1 is a block diagram illustrating an example video encoding and decoding system that may utilize the techniques described in this disclosure.

FIG. 1 is a block diagram illustrating an example video encoding and decoding system 10 that may be configured to utilize techniques for motion prediction and parallel coding in accordance with examples of this disclosure. As shown in FIG. 1, system 10 includes source device 12 that transmits encoded video to destination device 14 via communication channel 16. Encoded video data may also be stored on storage medium 34 or file server 36 and may be accessed by destination device 14 as desired. When stored to a storage medium or file server, video encoder 20 may provide coded video data to another device, such as a network interface, a compact disc (CD), Blu-ray or digital video disc (DVD) burner or stamping facility device, or other devices, for storing the coded video data to the storage medium. Likewise, a device separate from video decoder 30, such as a network interface, CD or DVD reader, or the like, may retrieve coded video data from a storage medium and provided the retrieved data to video decoder 30.

Source device 12 and destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, communication channel 16 may comprise a wireless channel, a wired channel, or a combination of wireless and wired channels suitable for transmission of encoded video data. Similarly, file server 36 may be accessed by destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques for motion vector prediction, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, modulator/demodulator 22 and transmitter 24. In source device 12, video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications, or application in which encoded video data is stored on a local disk.

The captured, pre-captured, or computer-generated video may be encoded by video encoder 20. The encoded video information may be modulated by modem 22 according to a communication standard, such as a wireless communication protocol, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

The captured, pre-captured, or computer-generated video that is encoded by video encoder 20 may also be stored onto storage medium 34 or file server 36 for later consumption. Storage medium 34 may include Blu-ray discs, DVDs, CD-ROMs, flash memory, or any other suitable digital storage media for storing encoded video. The encoded video stored on storage medium 34 may then be accessed by destination device 14 for decoding and playback.

File server 36 may be any type of server capable of storing encoded video and transmitting that encoded video to destination device 14. Example file servers include a web server (e.g., for a website), an FTP server, network attached storage (NAS) devices, a local disk drive, or any other type of device capable of storing encoded video data and transmitting it to a destination device. The transmission of encoded video data from file server 36 may be a streaming transmission, a download transmission, or a combination of both. File server 36 may be accessed by destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

Destination device 14, in the example of FIG. 1, includes receiver 26, modem 28, video decoder 30, and display device 32. Receiver 26 of destination device 14 receives information over channel 16, and modem 28 demodulates the information to produce a demodulated bitstream for video decoder 30. The information communicated over channel 16 may include a variety of syntax information generated by video encoder 20 for use by video decoder 30 in decoding video data. Such syntax may also be included with the encoded video data stored on storage medium 34 or file server 36. Each of video encoder 20 and video decoder 30 may form part of a respective encoder-decoder (CODEC) that is capable of encoding or decoding video data.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Video encoder 20 may implement any or all of the techniques of this disclosure for motion vector prediction in a video encoding process. Likewise, video decoder 30 may implement any or all of these techniques motion vector prediction in a video coding process. A video coder, as described in this disclosure, may refer to a video encoder or a video decoder. Similarly, a video coding unit may refer to a video encoder or a video decoder. Likewise, video coding may refer to video encoding or video decoding.

As will be described in more detail below, video decoder 30 may be configured to receive an indication of a size of a parallel motion estimation (PME) area, perform a motion vector prediction process on coding units having a size smaller than or equal to the PME area using a PME style candidate list construction process and the PME area, derive an implicit PME area for coding units having a size larger than the PME area, and perform the motion vector prediction process on coding units having the size larger than the PME area using the PME style candidate list construction process and the implicit PME area.

In another example of the disclosure, video encoder 20 may be configured to perform a motion vector prediction process on coding units having a size smaller than or equal to a PME area using a PME style candidate list construction process and the PME area, perform the motion vector prediction process on coding units having the size larger than the PME area using the PME style candidate list construction process and an implicit PME area, and signal an indication of a size of a parallel motion estimation (PME) area.

A new video coding standard, namely High-Efficiency Video Coding (HEVC), is currently being developed by the Joint Collaboration Team on Video Coding (JCT-VC) of ITU-Video Coding Experts Group (VCEG) and ISO/IEC Motion Picture Experts Group (MPEG). The most recent working draft of the HEVC specification is described in document JCTVC-11003, Bross et al., "High efficiency video coding (HEVC) text specification draft 9," Joint Collaborative Team on Video Coding (JCT-VC) of ITU-T SG16 WP3 and ISO/IEC JTC1/SC29/WG11, and referred to as HEVC WD9 hereinafter, is available from phenix.int-evry.fr/.

The techniques of this disclosure will be generally described with relation to the emerging HEVC standard. However, the techniques of this disclosure may be applicable for use with other video coding technologies, including non-standard video codecs and other standard video codecs, including any of the aforementioned video coding standards, as well as with any future standards or future extensions of the aforementioned standards. In addition, the techniques of this disclosure may be applicable for use with extensions to HEVC. Such extensions may include multiview coding (MVC) extensions, scalable video coding extensions (SVC), and 3D video coding extensions (e.g., 3DV, multiview plus depth).

The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-four intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU generally corresponds to a size of the coding node and must typically be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values from the video block identified by the coding node in accordance with the PU. The coding node is then updated to reference the residual values rather than the original video block. The residual values comprise pixel difference values that may be transformed into transform coefficients, quantized, and scanned using the transforms and other transform information specified in the TUs to produce serialized transform coefficients for entropy coding. The coding node may once again be updated to refer to these serialized transform coefficients. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data to which the transforms specified by TUs of the CU are applied. The residual data may correspond to pixel differences between pixels of the unencoded picture and prediction values corresponding to the CUs. Video encoder 20 may form the residual data for the CU, and then transform the residual data to produce transform coefficients.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Figure 2:
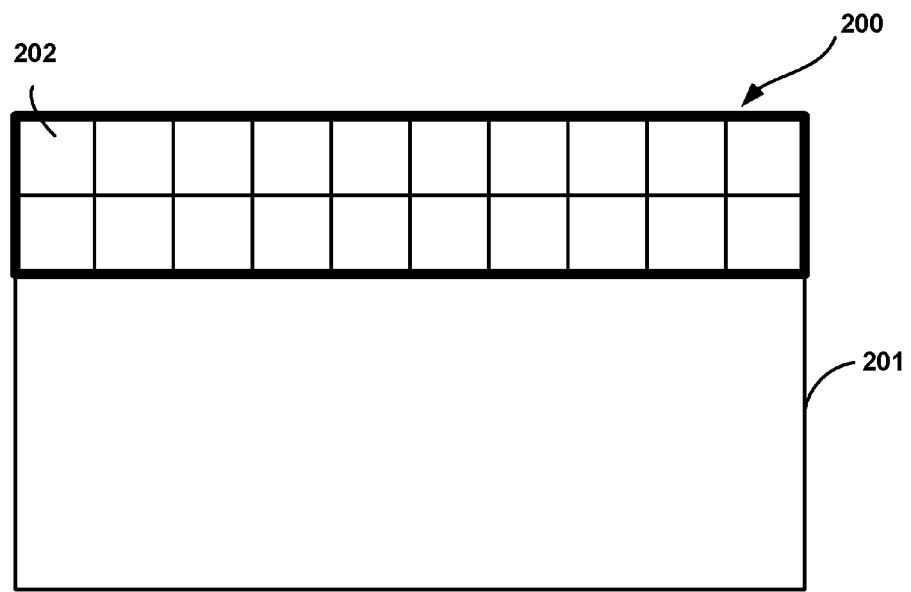
FIG. 2 is a conceptual diagram illustrating a slice divided into adjacent parallel motion estimation (PME) areas.

In recent HEVC standardization activities, there are several proposals related to enabling a so called parallel motion estimation (PME) area. A PME area usually consists of a CU group, where motion estimation (ME) is done in parallel for each CU in the group. Performing motion estimation in parallel may speed up the processing time for both encoding and decoding. One proposal for PME suggests that the size of this PME area should be signaled in the encoded video bitstream at the slice level. The same sized PME area is applied within the particular slice. That is, a slice is divided into a certain number of adjacent PME areas, dependent on the size of the slice. FIG. 2 is a conceptual diagram showing a slice 200 of video frame 201 divided into adjacent PME areas 202.

Motion estimation is a process used to determine a motion vector for a block of video data (e.g., a PU or a CU). The encoder determines these motion vectors by, as one example, performing what may be referred to as a "motion search" in a reference frame, where the encoder searches for each block in either a temporally subsequent or future reference frame. Upon finding a portion of the reference frame that best matches (or adequately matches) the current block, the encoder determines the current motion vector for the current block as the difference in the location from the current block to the matching portion in the reference frame (i.e., from the center of the current block to the center of the matching portion).

In some examples, an encoder may signal the motion vector for each block in the encoded video bitstream. The signaled motion vector is used by the decoder to perform motion compensation in order to decode the video data. However, signaling the entire motion vector may result in less efficient coding than could be achieved with predictive motion vector signaling.

In some instances, rather than signal the entire motion vector, the encoder may predict a motion vector for each partition. In performing a motion vector prediction process, the encoder may select a set of candidate motion vectors determined for spatially neighboring PUs in the same frame as the current block or a candidate motion vector determined for a co-located PU in another reference frame. The encoder may perform motion vector prediction rather than signal an entire motion vector to reduce complexity and bit rate in signaling.

Two different modes or types of motion vector prediction are currently proposed for use in HEVC. One mode is referred to as a "merge" mode. The other mode is referred to as an advanced motion vector prediction (AMVP) mode. In merge mode, the encoder instructs a decoder, through bitstream signaling of prediction syntax, to copy the motion information from a selected candidate block (the motion vector predictor or "MVP") for a current block of the frame. The motion information includes the motion vector, reference index (identifying a reference frame, in a given reference picture list, to which the motion vector points) and the motion prediction direction (which identifies the reference picture list, i.e., in terms of whether the reference frame temporally precedes or follows the currently frame). In merge mode, video encoder signals an index (e.g., mvp_idx) in the encoded video bitstream identifying the candidate block having the selected candidate motion vector.

Thus, for merge mode, the prediction syntax may include a flag identifying the mode (in this case "merge" mode) and an index identifying the location of the candidate block. In some instances, the candidate block will be a causal block in reference to the current block. That is, the candidate block will have already been decoded by the decoder. As such, the decoder has already received and/or determined the motion vector, reference index, and motion prediction direction for the candidate block. As such, the decoder may simply retrieve the motion vector, reference index, and motion prediction direction associated with the candidate block from memory and copy these values for the current block.

In AMVP mode, the encoder instructs the decoder, through bitstream signaling, to only copy the motion vector from the candidate block (i.e., the MVP), and signals the reference frame and the prediction direction separately. In AMVP mode, the motion vector to be copied may be signaled by sending a motion vector difference (MVD). An MVD is the difference between the current motion vector for the current block and a candidate motion vector for the selected candidate block. In this way, the decoder need not use an exact copy of the candidate motion vector for the current motion vector, but may rather use a candidate motion vector that is "close" in value to the current motion vector and add the MVD to reproduce the current motion vector. In most circumstances, the MVD requires fewer bits to signal than the entire current motion vector.

As such, AMVP mode allows for precise signaling of the current motion vector while maintaining coding efficiency, relative to signaling the whole motion vector. In contrast to AMVP, the merge mode does not allow for the specification of an MVD, and as such, merge mode sacrifices accuracy of motion vector signaling for increased signaling efficiency (i.e., fewer bits). The prediction syntax for AMVP mode may include a flag for the mode (in this case AMVP mode), the index for the candidate block, the MVD between the current motion vector and the candidate motion vector for the candidate block, the reference index, and the motion prediction direction. AMVP mode may select a candidate block in a similar fashion as to that of merge mode.

Figure 3:
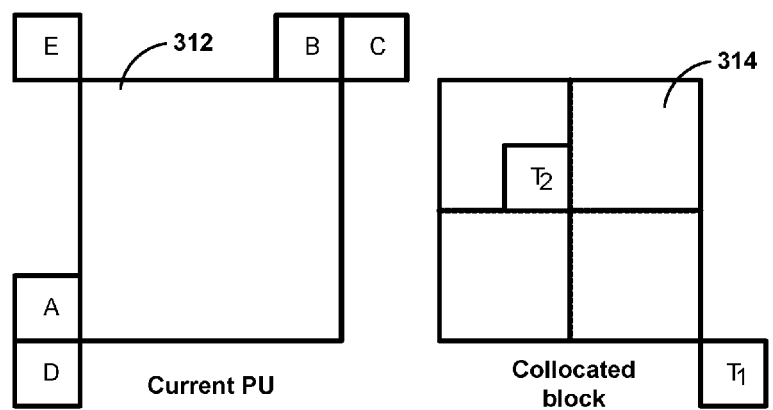
FIG. 3 is a conceptual diagram illustrating candidate blocks for motion vector prediction.

FIG. 3 is a conceptual diagram illustrating spatial and temporal neighboring blocks from which motion vector predictor candidates are generated for motion vector prediction modes. In one example proposal for HEVC, both merge and AMVP mode uses the same motion vector predictor candidate list from which to determine a motion vector for a current video block or PU 312. The motion vector predictor candidates in the merge mode and AMVP mode may include motion vectors for spatial neighboring blocks of current PU 312, for example, neighboring blocks A, B, C, D and E illustrated in FIG. 3. The motion vector predictor candidates may also include motion vectors for temporal neighboring blocks of a collocated block 314 of current PU 312, for example, neighboring blocks $T_1$ and $T_2$ illustrated in FIG. 3. A collocated block is a block in a different picture than the currently coded block. In some cases, the motion vector predictor candidates may include combinations of motion vectors for two or more of the neighboring blocks, e.g., an average, median, or weighted average of the two or more motion vectors.

When performing a motion vector prediction process (e.g., in merge or AMVP mode), an index for a motion vector predictor candidate for a current CU is determined from a motion vector candidate list. However, if PME is enabled, restrictions may apply to what neighboring blocks may be available as motion vector predictor candidates. For example, one CU in the CU group cannot have motion vector predictor candidates referring to other CUs of the CU group for the same PME area. This is because motion estimation for other CUs of the group has not yet been performed, as motion estimation for each CU in the group for the PME area is done in parallel. As such, no motion vector information for the neighboring CUs in the same PME area would be available for consideration in a motion vector prediction process.

As mentioned above, in one example, the size of a PME area may be signaled at the slice header. In other examples, the PME area may be signaled at other levels. For example, the PME area may be signaled at the LCU level, at the picture level, in a picture parameter set (PPS), in an adaptation parameter set (APS), in a sequence parameter set (SPS), etc. Example sizes for the PME region include 8×8, 16×16, 32×32 or 64×64. The size of the PME region may also be signaled as zero, meaning that PME is not used. As such, a decoder may be configured to support both modes: PME and non-PME (normal) mode.

Since, in the PME area, all ME is performed in parallel, motion information cannot be used from the CUs located inside the same PME area. In other words, inter-CU group dependency is removed for the PME region. Additionally, for parallel ME, it may be desirable to break inter-PU dependency as well. In this case, one PU cannot use the motion information from the neighbor PU of the same CU. So, with PME enabled, all the PU and CU dependencies should be resolvable within the same PME region. Such a dependency resolving process may be called motion vector candidate list construction in "PME style" (i.e., PME style candidate list construction).

Figure 4:
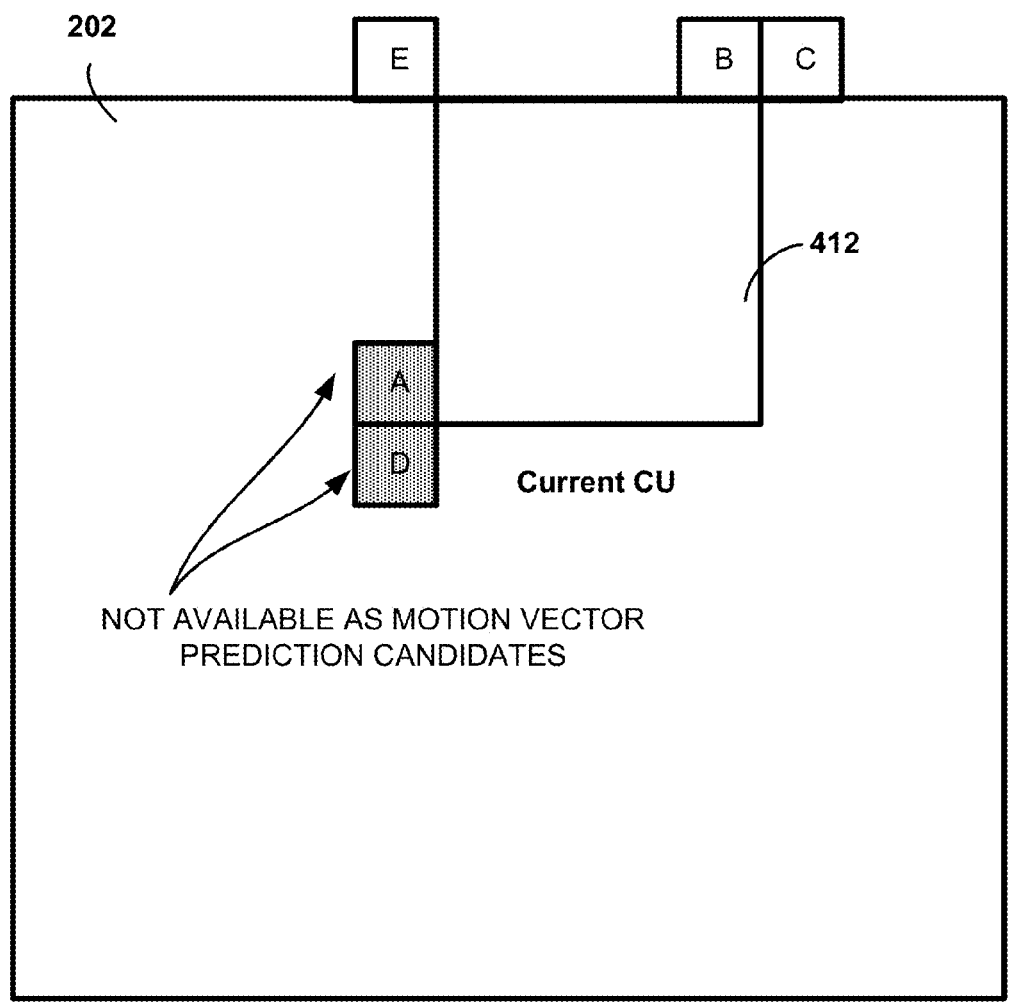
FIG. 4 is a conceptual diagram illustrating unavailable candidate blocks for PME style candidate list construction.

FIG. 4 is a conceptual diagram illustrating unavailable candidate blocks for PME style candidate list construction. As shown in FIG. 4, current CU 412 is within PME area 202. In this example, candidate neighboring blocks E, B and C, for a motion vector prediction process (e.g., merge mode or AMVP mode), are outside of the PME area. As such, these candidate blocks may be used for the motion prediction process. However, candidate blocks A and D are from another CU within PME area 202. As such, these candidate blocks would be removed (or not added) to the candidate list for the motion vector prediction process.

Figure 5:
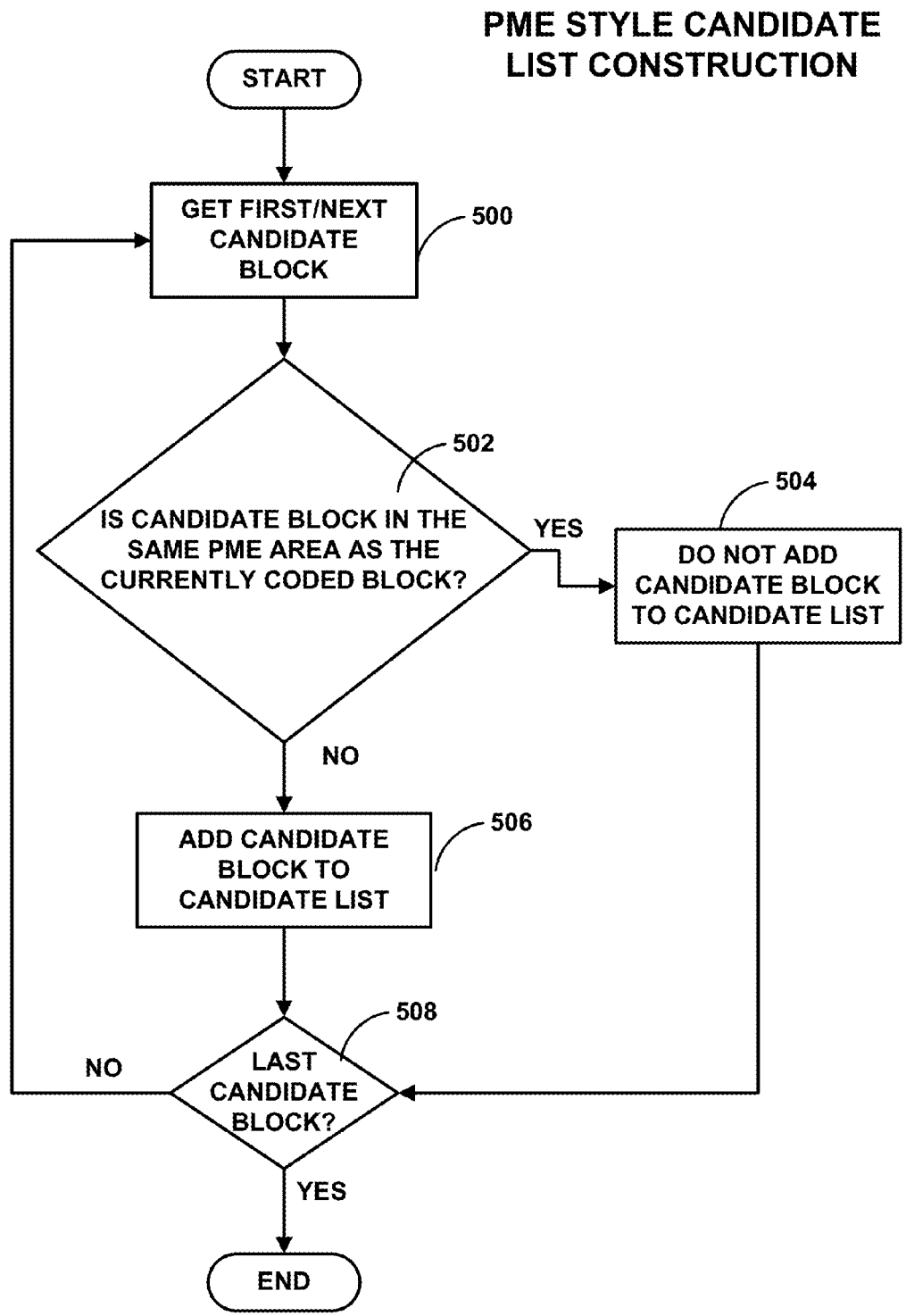
FIG. 5 is a flowchart illustrating an example of PME style candidate list construction.

FIG. 5 is a flowchart illustrating an example of PME style candidate list construction. Initially, video encoder 20 and/or video decoder 30 considers a first possible candidate block in a list of candidate blocks (500). As one example, the possible candidate blocks may be the candidate blocks shown in FIG. 3. However, other configurations of candidate blocks may be used. Next, video encoder 20 and/or video decoder 30 determines if the candidate block is in the same PME are as the currently code block (502). In one example, it is only determined if the candidate block is from a CU within the same PME area. In another example, it is determined if the candidate block is a PU within the same PME area. When considering PUs, the candidate PU may be from the same CU as the currently coded CU.

If the possible candidate block is within the same PME area as the currently coded block, video encoder 20 and/or video decoder 30 does not add the possible candidate block to the candidate list (504). If the possible candidate block is not within the same PME area as the currently coded block, video encoder 20 and/or video decoder 30 adds the possible candidate block to the candidate list (506). Next, video encoder 20 and/or video decoder 30 determines if the possible candidate block was the last candidate block (508). If so, the candidate list construction stops. If not, the candidate list construction process restarts for the next possible candidate block in the list. In one example, only a fixed number n candidate blocks are checked for addition to the candidate list. In another example, if one or more possible candidate blocks (e.g., those show in FIG. 3) are not included in the candidate list because they fall within the PME area, one or more additional candidate blocks may be considered for inclusion in the list.

The above process for candidate list construction applies when PME is enabled. However, for non-PME (normal) ME, the dependencies between the PUs and CUs may be present. For example, a temporal reference index may be derived from the neighbor CU or PU because the neighbor CU or PU is not processed in parallel with the currently coded CU or PU. In addition, for N×N partitioning mode, motion information may be taken from neighbor PUs of the same CU. The candidate list construction process that does not restrict for CU and PU inter-dependencies may be referred to as "normal style" candidate list construction.

In summary, with PME concepts enabled, a motion vector candidate list may be constructed in two different ways (e.g., PME style and normal style). A decoder compatible with PME may be configured to support both modes, thus causing a potential increase in implementation cost. In view of the above-mentioned drawbacks, this disclosure presents techniques for coding motion vectors for PME enabled video coders. The techniques include the implicit derivation of a PME area for blocks larger than the signaled PME area (i.e., the explicit PME area).

As mentioned above, in one example, the PME size may be signaled at the slice header. So, for CUs with a size smaller than or equal to the PME size, parallel motion estimation may be applied, and PME style motion vector candidate list construction is used. For CUs with a size larger than the PME size, normal style motion vector candidate list construction may be used.

However, to increase flexibility, this disclosure proposes that PME style motion vector candidate list construction may also be used for CUs larger than the signaled PME size. To support this feature, this disclosure proposes the concept of implicitly deriving a PME size.

According to examples of this disclosure, an implicit PME size is the size of a PME area that can be used with or without receiving a signaled PME size. The same PME style motion vector candidate mode may be used for this implicitly derived PME area, but there may be no size signaling for this region. The size of the implicit PME area may be derived, for example, based on CU size, PU size, CU prediction mode, partition mode and/or slice type.

For example, assume that the PME size signaled at slice header is 8×8. So, in this example, PME style motion vector candidate list construction may be used for all CUs smaller than or equal to 8×8. Instead of using normal style motion vector candidate list construction for CUs bigger than 8×8 CUs, implicitly derived PME areas may be applied for 16×16 and 32×32 CU sizes. That is, for a CU of size 16×16, video decoder 30 may be configured to apply a 16×16 PME area for that CU, as well as use PME style candidate list construction rules. Similarly, for a CU of size 32×32, video decoder 30 may be configured to apply a 32×32 PME area for that CU, as well as use PME style candidate list construction rules.

In another example, normal style merge mode may still be used for a 64×64 CU, while signaled and implicitly derived PME areas would be used for smaller CUs. In this example, when the explicitly signaled PME region is 8×8, implicitly derived PME regions may be applied for CUs of size 16×16 and 32×32 (the PME region for those sizes is derived without signaling). However, in this example, both PME and normal style merge modes may be used, and as such, a decoder may be configured to support both.

For hardware/software implementations of the decoder, it is desirable to have uniform motion vector prediction processing. Thus, using implicitly derived PME areas for CUs bigger than the signaled PME area, as well as uniformly applying PME style motion vector candidate list construction, may reduce implementation complexity of the decoder.

In another example of this disclosure, PME style motion vector candidate list construction may be applied for all CUs regardless of the PME size signaled (e.g., at the slice header) and regardless of the CU sizes. As such, a PME region with the size equal to the CU size can be implicitly derived and applied for all CUs that are located outside of the signaled PME area. So, normal motion vector candidate list construction can be removed completely and the decoder need only support PME style motion vector candidate list construction.

For example, if PME is not applied (e.g., PME size is signaled as zero), normal motion vector candidate list construction would be applied according to the current test model of HEVC. However, according to the techniques proposed in this disclosure, normal style motion vector candidate list construction can be replaced with PME style motion vector candidate list construction by implicit derivation of a PME size with the same size as the current CU size. As such, only PME style motion vector candidate list construction is used, and inter-PU dependencies that may exist in normal style motion vector candidate list construction are removed with the implicit application of the PME area and PME mode. In other words, only one PME style motion vector candidate list construction may be used for every CU, and all PUs of this CU can be processed in parallel.

In another example of the disclosure, a PME size N may be signaled at the slice header. In this case, a PME size may be implicitly applied for the CUs bigger than size N. PME style motion vector candidate list construction may then be applied for CUs with a size smaller than or equal to the signaled PME size N. At least all inter-CU dependencies can be removed. Additional inter-PU dependencies may be removed or may remain. A PME size may be implicitly derived for CUs bigger than the signaled PME size N. The size of implicit PME area may be equal to the CU size. In other words, only PME style motion vector candidate list construction may be used for these CUs, and all PUs of these CUs can be processed in parallel.

CUs located inside the signaled PME area and CUs for which PME is implicitly derived may exhibit a few differences. For the CUs located inside the PME area, at least inter-CU dependency can be removed. This means that, in this case, ME for every CU inside the PME area can be done in parallel, and inter-PU dependencies may still exist. On the other hand, for implicitly derived PME areas, the inter-PU dependencies may be removed. This means that, in this case, every PU of the same CU can be processed in parallel.

The techniques of this disclosure may be applied to any partition configuration, to any size of CU, and to any number of partitions and/or blocks. Although the techniques of this disclosure have been described generically for motion vector prediction process (e.g., merge mode and AMVP mode), the techniques of this disclosure may be applied to merge mode only, AMVP mode, both merge and AMVP mode, or any other modes of inter prediction.

The techniques of this disclosure that have been described with reference to CUs and partitions, may also be directed to PUs, LCUs, groups of blocks, and groups of partitions. The techniques of this disclosure may also be applied to a CU or block of other types, or at different levels. For example, the techniques of this disclosure may also be applied to an LCU, CU, PU, TU, group of LCUs, group of CUs, group of PUs, group of TUs or other sub block levels.

Figure 6:
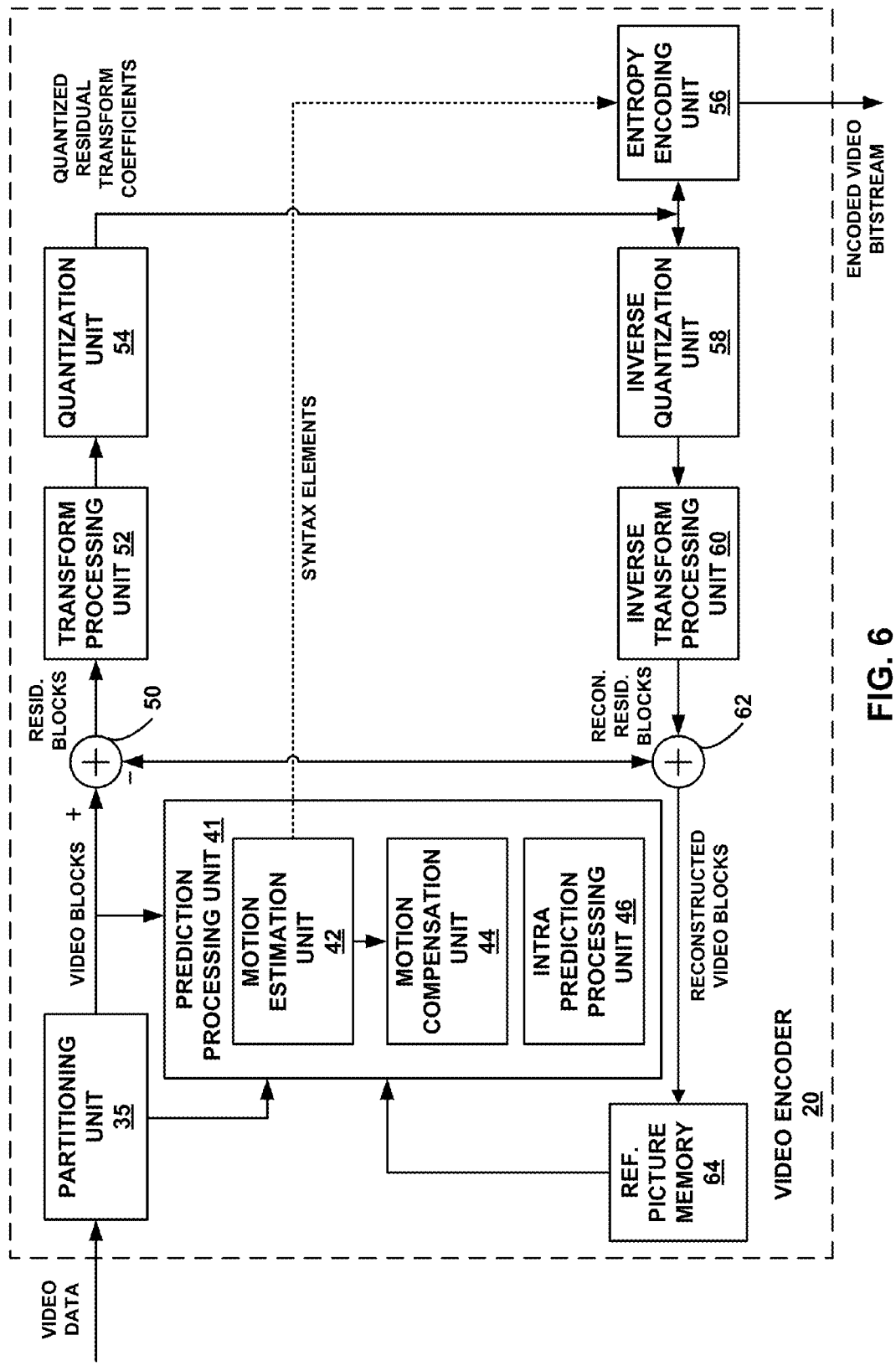
FIG. 6 is a block diagram illustrating an example video encoder that may implement the techniques described in this disclosure.

FIG. 6 is a block diagram illustrating an example video encoder 20 that may implement the techniques for motion vector prediction described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 6, video encoder 20 includes a partitioning unit 35, prediction processing unit 41, reference picture memory 64, summer 50, transform processing unit 52, quantization unit 54, and entropy encoding unit 56. Prediction processing unit 41 includes motion estimation unit 42, motion compensation unit 44, and intra prediction processing unit 46. For video block reconstruction, video encoder 20 also includes inverse quantization unit 58, inverse transform processing unit 60, and summer 62. A deblocking filter (not shown in FIG. 6) may also be included to filter block boundaries to remove blockiness artifacts from reconstructed video. If desired, the deblocking filter would typically filter the output of summer 62. Additional loop filters (in loop or post loop) may also be used in addition to the deblocking filter.

As shown in FIG. 6, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

According to examples of this disclosure, rather than signaling the motion vector itself, motion estimation unit 42 may use a motion vector prediction process. In addition, according to example of the disclosure, motion estimation unit 42 may be configured to perform PME, as well as PME style motion vector candidate list construction for both blocks within a PME area, as well as for blocks larger than a PME area. In the case where a block is larger than the PME area, motion estimation unit 42 may be configured to derive an implicit PME area equal to the size of the block.

In this way, motion estimation unit 42, alone or in combination with other functional units of video encoder 20, may be configured to perform a motion vector prediction process on coding units having a size smaller than or equal to a PME area using a PME style candidate list construction process and the PME area, perform the motion vector prediction process on coding units having the size larger than the PME area using the PME style candidate list construction process and an implicit PME area, and signal an indication of a size of a PME area.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

Figure 7:
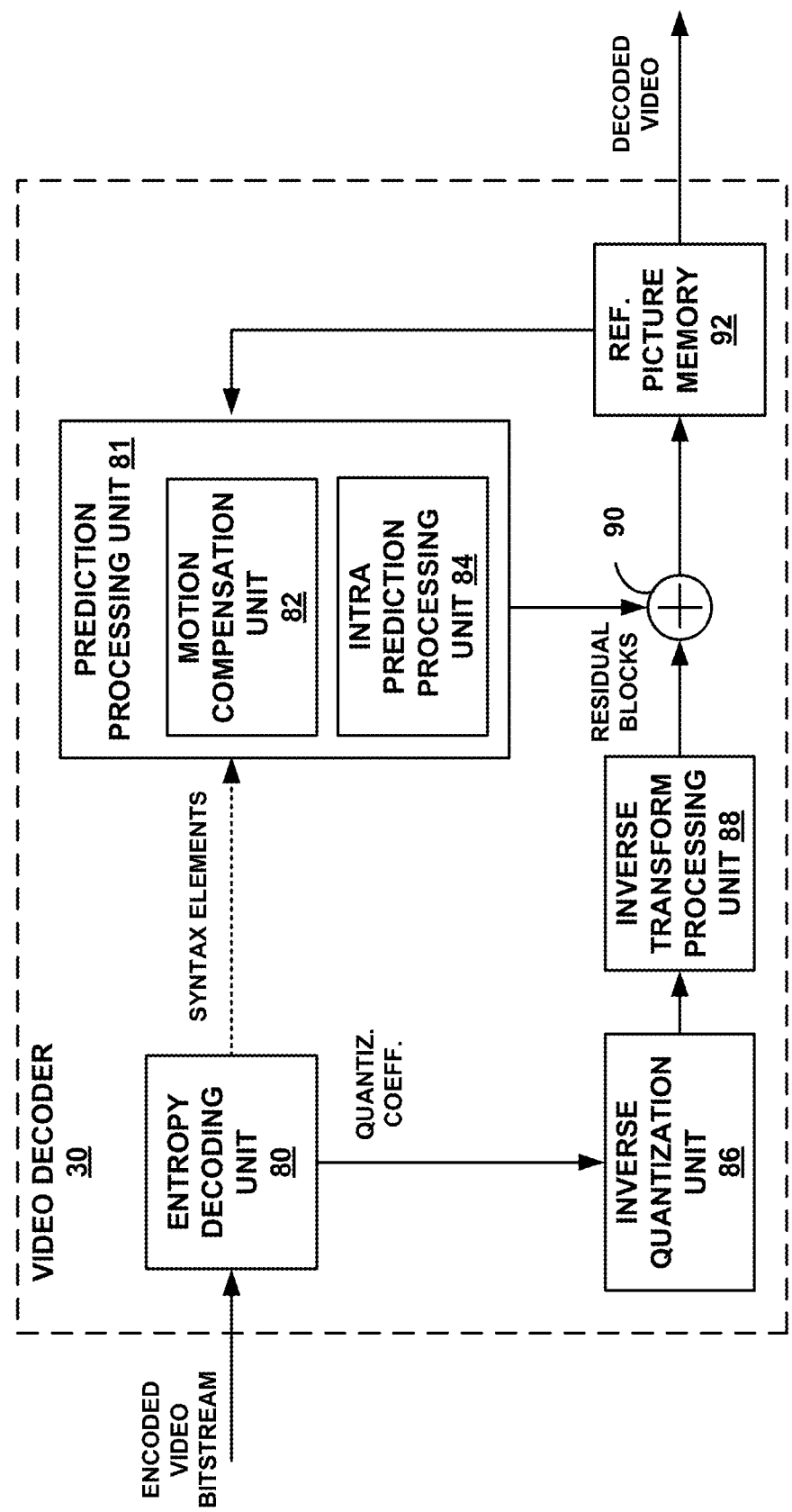
FIG. 7 is a block diagram illustrating an example video decoder that may implement the techniques described in this disclosure.

FIG. 7 is a block diagram illustrating an example video decoder 30 that may implement the techniques for motion vector prediction described in this disclosure. In the example of FIG. 7, video decoder 30 includes an entropy decoding unit 80, prediction processing unit 81, inverse quantization unit 86, inverse transformation unit 88, summer 90, and reference picture memory 92. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 6.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

According to examples of this disclosure, motion compensation unit 82 may use a motion vector prediction process. In addition, according to example of the disclosure, motion compensation unit 82 may be configured to perform PME, as well as PME style motion vector candidate list construction for both blocks within a PME area, as well as for blocks larger than a PME area. In the case where a block is larger than the PME area, motion compensation unit 82 may be configured to derive an implicit PME area equal to the size of the block.

In this way, motion compensation unit 82, alone or in combination with other functional units of video decoder 30, may be configured to receive an indication of a size of a PME area, perform a motion vector prediction process on coding units having a size smaller than or equal to the PME area using a PME style candidate list construction process and the PME area, derive an implicit PME area for coding units having a size larger than the PME area, and perform the motion vector prediction process on coding units having the size larger than the PME area using the PME style candidate list construction process and the implicit PME area.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

Figure 8:
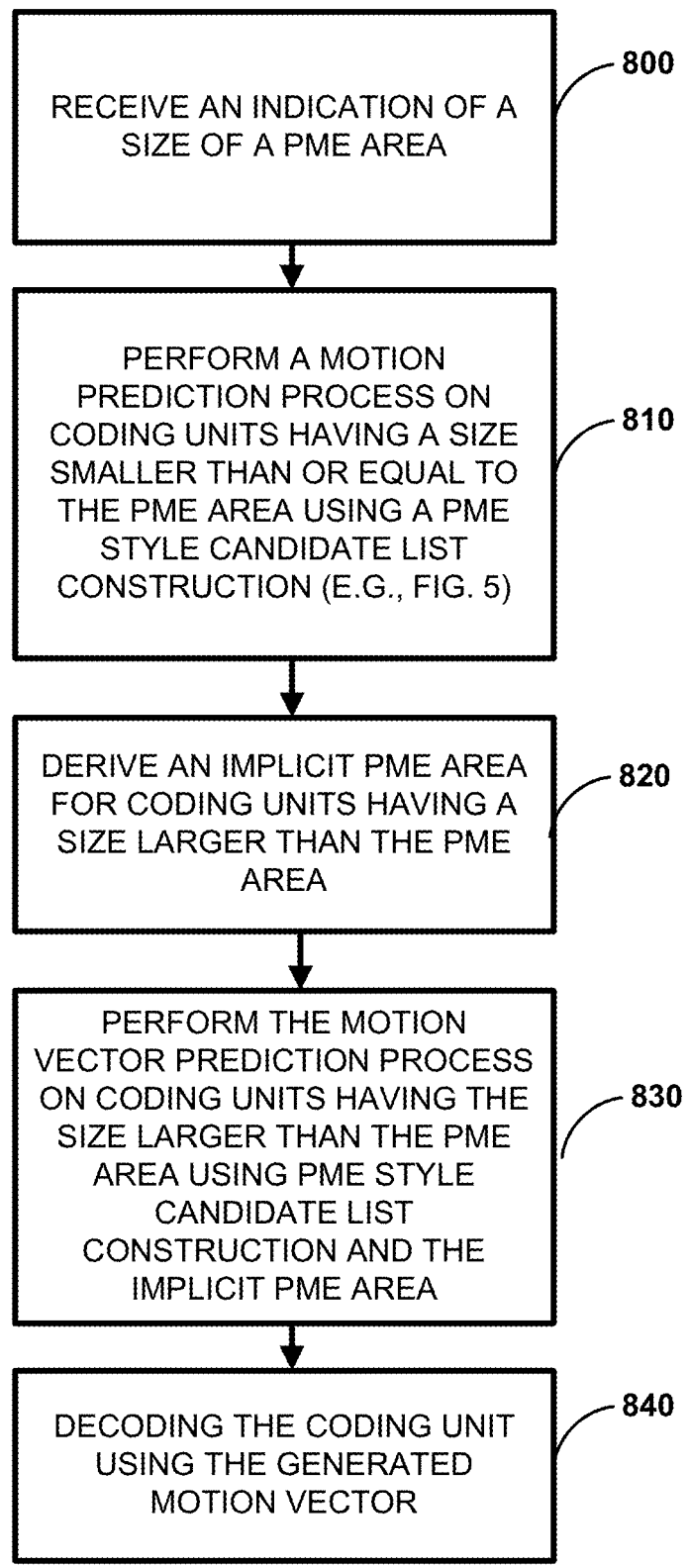
FIG. 8 is a flowchart illustrating an example decoding method according to the techniques of this disclosure.

FIG. 8 is a flowchart illustrating an example decoding method according to the techniques of this disclosure. The method of FIG. 8 may be implemented by one or more hardware units of video decoder 30. In one example, video decoder 30 may be configured to receive an indication of a size of a PME area (800), and perform a motion vector prediction process on coding units having a size smaller than or equal to the PME area using a PME style candidate list construction process and the PME area (810). Parallel motion estimation and motion vector prediction may be performed by motion compensation unit 82, in one example. In one example, the PME style candidate list construction process removes inter coding unit dependencies in a motion vector candidate list for the motion vector prediction process. In another example, the PME style candidate list construction process further removes inter prediction unit dependencies in the motion vector candidate list.

Video decoder 30 may be further configured to derive an implicit PME area for coding units having a size larger than the PME area (820), and perform the motion vector prediction process on coding units having the size larger than the PME area using the PME style candidate list construction process and the implicit PME area (830). In one example, the implicit PME area is equal to the size of a particular coding unit having the size larger than the PME area. In performing the motion vector prediction process, video decoder 30 generates a motion vector. Video decoder 30 is then further configured to decode the coding unit using the generated motion vector (840).

Video decoder 30 may be configured to perform PME candidate list construction using the techniques described above with reference to FIG. 5. In one example of PME style candidate list construction, video decoder 30 may be configured to determine if a candidate block is within the PME area or the implicit PME area, in the case that the candidate block is within the PME area or the implicit PME area, not add the candidate block to the motion vector candidate list, and in the case that the candidate block is not within the PME area or the implicit PME area, add the candidate block to the motion vector candidate list.

The techniques of FIG. 8 may be applied to any type of motion vector prediction process, including a merge mode and an AMVP mode. The techniques of FIG. 8 may also apply to situations where video decoder 30 is configured to perform parallel motion estimation in parallel for all coding units within the PME area and the implicit PME area, and where video decoder 30 is configured to perform motion estimation in parallel for all prediction units of coding units larger than the PME area.

Figure 9:
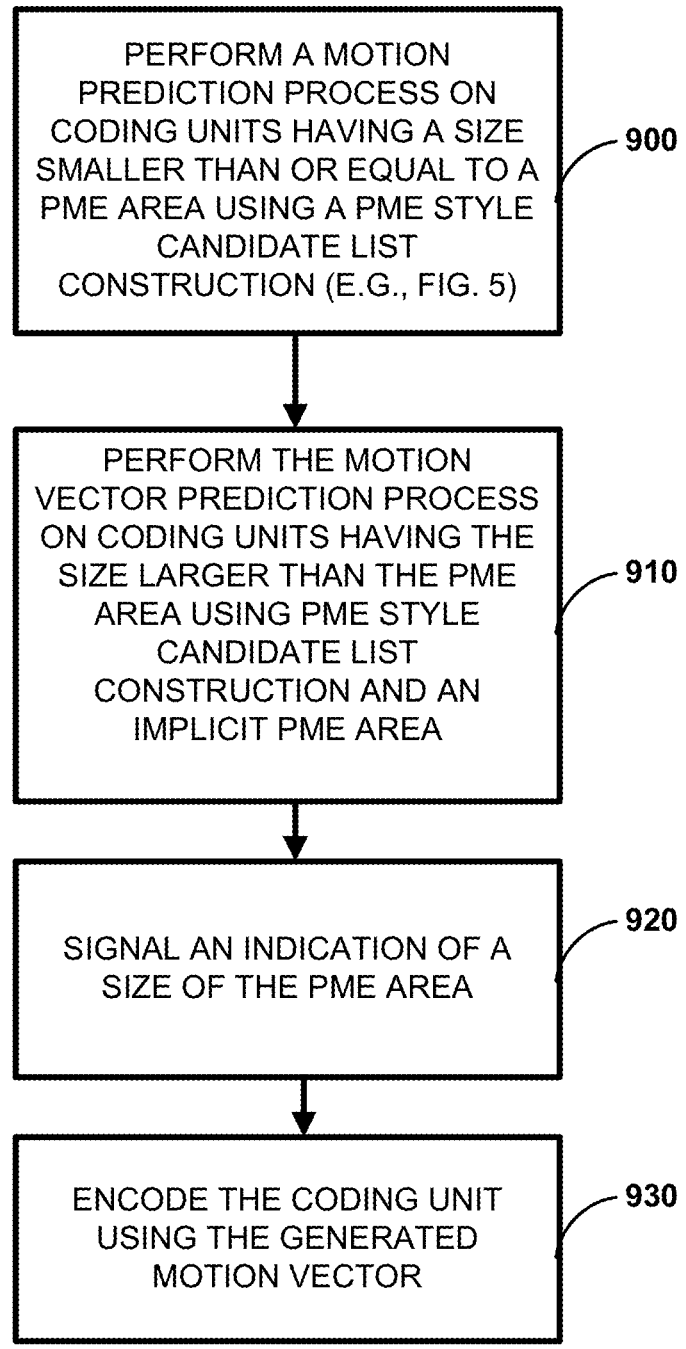
FIG. 9 is a flowchart illustrating an example encoding method according to the techniques of this disclosure.

FIG. 9 is a flowchart illustrating an example encoding method according to the techniques of this disclosure. The method of FIG. 9 may be implemented by one or more hardware units of video encoder 20. In one example, video encoder 20 may be configured to perform a motion vector prediction process on coding units having a size smaller than or equal to a PME area using a PME style candidate list construction process and the PME area (900). Parallel motion estimation and the motion vector prediction process may be performed by prediction processing unit 41, including one or more of motion estimation unit 42 and motion compensation unit 44. Video encoder 20 may also signal an indication of a size of the PME area in an encoded video bitstream (920).

Video encoder 20 may be further configured to perform the motion vector prediction process on coding units having the size larger than the PME area using the PME style candidate list construction process and an implicit PME area (910). In one example, the implicit PME area is equal to the size of a particular coding unit having the size larger than the PME area. In performing the motion vector prediction process, video encoder 20 generates a motion vector. Video encoder 20 is then further configured to encode the coding unit using the generated motion vector (930).

Video encoder 20 may be configured to perform PME candidate list construction using the techniques described above with reference to FIG. 5. In one example of PME style candidate list construction, video encoder 20 may be configured to determine if a candidate block is within the PME area or the implicit PME area, in the case that the candidate block is within the PME area or the implicit PME area, not add the candidate block to the motion vector candidate list, and in the case that the candidate block is not within the PME area or the implicit PME area, add the candidate block to the motion vector candidate list.

The techniques of FIG. 9 may be applied to any type of motion vector prediction process, including a merge mode and an AMVP mode. The techniques of FIG. 9 may also apply to situations where video encoder 20 is configured to perform parallel motion estimation in parallel for all coding units within the PME area and the implicit PME area, and where video encoder 20 is configured to perform motion estimation in parallel for all prediction units of coding units larger than the PME area.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data, the method comprising:
    receiving a video frame of encoded video data;
    receiving an indication of a size of a parallel motion estimation (PME) area, the PME area being an area of the video frame in which motion estimation performed in parallel;
    determining whether coding units of the video frame are larger than the PME area by comparing a size of the coding units to the size of the PME area;
    deriving an implicit PME area for particular coding units of the video frame determined to have the size larger than the PME area, the implicit PME area being the size of the particular coding units:
    performing a motion vector prediction process to determine motion vectors for coding units of the video frame having a size smaller than or equal to the PME area using a PME candidate list construction process and the PME area;
    performing the motion vector prediction process to determine motion vectors for coding units of the video frame having the size larger than the PME area using the PME candidate list construction process and the implicit PME area;
    performing the PME candidate construction process on the video frame, wherein the PME candidate list construction process removes inter coding unit dependencies in a motion vector candidate list for the motion vector prediction process, and wherein performing the PME candidate list construction process comprises:
    determining if a candidate block is within the PME area or the implicit PME area;
    in the case that the candidate block is within the PME area or the implicit PME area, not adding the candidate block to the motion vector candidate list; and in the case that the candidate block is not within the PME area or the implicit PME area, adding the candidate block to the motion vector candidate list; and
    decoding the video frame using the determined motion vectors.

2. The method of claim 1, wherein deriving the implicit PME area comprises deriving the implicit PME area to be equal to the size of a particular coding unit having the size larger than the PME area.

3. The method of claim 1, wherein the PME candidate list construction process further removes inter prediction unit dependencies in the motion vector candidate list.

4. The method of claim 1, wherein the motion vector prediction process is a merge mode.

5. The method of claim 1, wherein the motion vector prediction process is an advanced motion vector prediction process.

6. The method of claim 1, the method further comprising:
    performing motion estimation in parallel for all coding units within the PME area and the implicit PME area.

7. The method of claim 1, the method further comprising:
    performing motion estimation in parallel for all prediction units of coding units larger than the PME area.

8. A method for encoding video data, the method comprising:
    receiving a video frame of video data;
    determining a size of a parallel motion estimation (PME) area;
    determining whether coding units of the video frame are larger than the PME area by comparing a size of the coding units to the size of the PME area;
    deriving an implicit PME area for particular coding units of the video frame determined to have the size larger than the PME area, the implicit PME area being the size of the particular coding units;
    performing a motion vector prediction process to determine motion vectors for coding units of the video frame having a size smaller than or equal to the PME area using a PME candidate list construction process and the PME area, the PME area being an area of a video frame in which motion estimation is performed in parallel;
    performing the motion vector prediction process to determine motion vectors for coding units of the video frame having the size larger than the PME area using the PME candidate list construction process and the implicit PME area;
    performing the PME candidate list construction process on the video frame, wherein the PME candidate list construction process removes inter coding unit dependencies in a motion vector candidate list for the motion vector prediction process, and wherein performing the PME candidate list construction process comprises:
    determining if a candidate block is within the PME area or the implicit PME area;
    in the case that the candidate block is within the PME area or the implicit PME area, not adding the candidate block to the motion vector candidate list; and
    in the case that the candidate block is not within the PME area or the implicit PME area, adding the candidate block to the motion vector candidate list;
    encoding the video frame using the determined motion vectors;
    signaling the encoded video frame; and
    signaling an indication of the size of the PME area.

9. The method of claim 8, wherein the implicit PME area is equal to the size of a particular coding unit having the size larger than the PME area.

10. The method of claim 8, wherein the PME candidate list construction process further removes inter prediction unit dependencies in the motion vector candidate list.

11. The method of claim 8, wherein the motion vector prediction process is a merge mode.

12. The method of claim 8, wherein the motion vector prediction process is an advanced motion vector prediction process.

13. The method of claim 8, the method further comprising:
    performing motion estimation in parallel for all coding units within the PME area and the implicit PME area.

14. The method of claim 8, the method further comprising:
    performing motion estimation in parallel for all prediction units of coding units larger than the PME area.

15. An apparatus configured to decode video data, the apparatus comprising:
    a memory configured to store the video data; and
    a video decoder configured to:
    receive a video frame of encoded video data;
    receive an indication of a size of a parallel motion estimation (PME) area; the PME area being an area of the video frame in which motion estimation is performed in parallel;
    determine whether coding units of the video frame are larger than the PME area by comparing a size of the coding units to the size of the PME area;
    derive an implicit PME area for particular coding units of the video frame determined to have the size larger than the PME area, the implicit PME area being the size of the particular coding units;

perform a motion vector prediction process to determine motion vectors for coding units of the video frame having a size smaller than or equal to the PME area using a PME candidate list construction process and the PME area;

perform the motion vector prediction process to determine motion vectors for coding units of the video frame having the size larger than the PME area using the PME candidate list construction process and the implicit PME area;

perform the PME candidate list construction process on the video frame, wherein the PME candidate list construction process removes inter coding unit dependencies in a motion vector candidate list for the motion vector prediction process, and wherein the video decoder is further configured to:

determine if a candidate block is within the PME area or the implicit PME area;

in the case that the candidate block is within the PME area or the implicit PME area, not add the candidate block to the motion vector candidate list;

in the case that the candidate block is not within the PME area or the implicit PME area, add the candidate block to the motion vector candidate list; and decode the video frame using the determined motion vectors.

16. The apparatus of claim 15, wherein the video decoder is configured to derive the implicit PME area to be equal to the size of a particular coding unit having the size larger than the PME area.

17. The apparatus of claim 15, wherein the PME candidate list construction process further removes inter prediction unit dependencies in the motion vector candidate list.

18. The apparatus of claim 15, wherein the motion vector prediction process is a merge mode.

19. The apparatus of claim 15, wherein the motion vector prediction process is an advanced motion vector prediction process.

20. The apparatus of claim 15, wherein the video decoder is further configured to:
perform motion estimation in parallel for all coding units within the PME area and the implicit PME area.

21. The apparatus of claim 15, wherein the video decoder is further configured to:
perform motion estimation in parallel for all prediction units of coding units larger than the PME area.

22. An apparatus configured to encode video data, the apparatus comprising:
a memory configured to store the video data; and
a video encoder configured to:
receive a video frame of video data;
determine a size of a parallel motion estimation (PME) area;
determine whether coding units of the video frame are larger than the PME area by comparing a size of the coding units to the size of the PME area;
derive an implicit PME area for particular coding units of the video frame determined to have the size larger than the PME area, the implicit PME area being the size of the particular coding units;
perform a motion vector prediction process to determine motion vectors for coding units of the video frame having a size smaller than or equal to the PME area using a PME candidate list construction process and the PME area, the PME area being an area of a video frame in which motion estimation is performed in parallel;

perform the motion vector prediction process to determine motion vectors for coding units of the video frame having the size larger than the PME area using the PME candidate list construction process and the implicit PME area;

perform the PME candidate list construction process on the video frame, wherein the PME candidate list construction process removes inter coding unit dependencies in a motion vector candidate list for the motion vector prediction process; and wherein the video encoder is further configured to:

determine if a candidate block is within the PME area or the implicit PME area;

in the case that the candidate block is within the PME area or the implicit PME area, not add the candidate block to the motion vector candidate list; and in the case that the candidate block is not within the PME area or the implicit PME area, add the candidate block to the motion vector candidate list;

encode the video frame using the determined motion vectors;

signal the encoded video frame; and signal an indication of the size of the PME area.

23. The apparatus of claim 22, wherein the implicit PME area is equal to the size of a particular coding unit having the size larger than the PME area.

24. The apparatus of claim 22, wherein the PME candidate list construction process further removes inter prediction unit dependencies in the motion vector candidate list.

25. The apparatus of claim 22, wherein the motion vector prediction process is a merge mode.

26. The apparatus of claim 22, wherein the motion vector prediction process is an advanced motion vector prediction process.

27. The apparatus of claim 22, wherein the video encoder is further configured to:
perform motion estimation in parallel for all coding units within the PME area and the implicit PME area.

28. The apparatus of claim 22, wherein the video encoder is further configured to:
perform motion estimation in parallel for all prediction units of coding units larger than the PME area.

29. An apparatus configured to decode video data, the apparatus comprising:
means for receiving a video frame of encoded video data;
means for receiving an indication of a size of a parallel motion estimation (PME) area, the PME area being an area of the video frame in which motion estimation is performed in parallel;
means for determining whether coding units of the video frame are larger than the PME area by comparing a size of the coding units to the size of the PME area;
means for deriving an implicit PME area for particular coding units of the video frame determined to have the size larger than the PME area, the implicit PME area being the size of the particular coding units;
means for performing a motion vector prediction process to determine motion vectors for coding units of the video frame having a size smaller than or equal to the PME area using a PME candidate list construction process and the PME area;
means for performing the motion vector prediction process to determine motion vectors for coding units of the video frame having the size larger than the PME area using the PME candidate list construction process and the implicit PME area;

means for performing the PME candidate list construction process on the video frame, wherein the PME candidate list construction process removes inter coding unit dependencies in a motion vector candidate list for the motion vector prediction process, and wherein the means for performing the PME candidate list construction process comprises:

means for determining if a candidate block is within the PME area or the implicit PME area;

means for not adding the candidate block to the motion vector candidate list in the case that the candidate block is within the PME area or the PME area; and means for adding the candidate block to the motion vector candidate list in the case that the candidate block is not within the PME area or the implicit PME area; and means for decoding the video frame using the determined motion vectors.

30. The apparatus of claim 29, wherein the means for deriving the implicit PME area comprises means for deriving the implicit PME area to be equal to the size of a particular coding unit having the size larger than the PME area.

31. An apparatus configured to encode video data, the apparatus comprising:

means for receiving a video frame of video data;

means for determining a size of a parallel motion estimation (PME) area;

means for determining whether coding units of the video frame are larger than the PME area by comparing a size of the coding units to the size of the PME area;

means for deriving an implicit PME area for particular coding units of the video frame determined to have the size larger than the PME area, the implicit PME area being the size of the particular coding units;

means for performing a motion vector prediction process to determine motion vectors for coding units of the video frame having a size smaller than or equal to the PME area using a PME candidate list construction process and the PME area, the PME area being an area of a video frame in which motion estimation is performed in parallel;

means for performing the motion vector prediction process to determine motion vectors for coding units of the video frame having the size larger than the PME area using the PME candidate list construction process and the implicit PME area;

means for performing the PME candidate list construction process on the video frame, wherein the PME candidate list construction process removes inter coding unit dependencies in a motion vector candidate list for the motion vector prediction process, and wherein the means for performing the PME candidate list construction process comprises:

means for determining if a candidate block is within the PME area or the implicit PME area;

means for not adding the candidate block to the motion vector candidate list in the case that the candidate block is within the PME area or the implicit PME area; and means for adding the candidate block to the motion vector candidate list in the case that the candidate block is not within the PME area or the implicit PME area;

means for encoding the video frame using the determined motion vectors;

means for signaling the encoded video frame; and means for signaling an indication of the size of the PME area.

32. The apparatus of claim 31, wherein the implicit PME area is equal to the size of a particular coding unit having the size larger than the PME area.

33. A non-transitory computer-readable storage medium storing instructions that, when executed, cause one or more processors of a device configured to decode video data to:

receive a video frame of encoded video data;

receive an indication of a size of a parallel motion estimation (PME) area, the PME area being an area of the video frame in which motion estimation is performed in parallel;

determine whether coding units of the video frame are larger than the PME area by comparing a size of the coding units to the size of the PME area;

derive an implicit PME area for particular coding units of the video frame determined to have the size larger than the PME area, the implicit PME area being the size of the particular coding units;

perform a motion vector prediction process to determine motion vectors for coding units of the video frame having a size smaller than or equal to the PME area using a PME candidate list construction process and the PME area;

perform the motion vector prediction process to determine motion vectors for coding units of the video frame having the size larger than the PME area using the PME candidate list construction process and the implicit PME area;

perform the PME candidate list construction process on the video frame, wherein the PME candidate list construction process removes inter coding unit dependencies in a motion vector candidate list for the motion vector prediction process, and wherein the instructions further cause the one or more processors to:

determine if a candidate block is within the PME area or the implicit PME area;

in the case that the candidate block is within the PME area or the implicit PME area, not add the candidate block to the motion vector candidate list; and in the case that the candidate block is not within the PME area or the implicit PME area, add the candidate block to the motion vector candidate list; and decode the video frame using the determined motion vectors.

34. The non-transitory computer-readable storage medium of claim 33, wherein the instructions further cause the one or more processors to derive the implicit PME area to be equal to the size of a particular coding unit having the size larger than the PME area.

35. A non-transitory computer-readable storage medium storing instructions that, when executed, cause one or more processors of a device configured to encode video data to;

receive a video frame of video data;

determine a size of a parallel motion estimation (PME) area;

determine whether coding units of the video frame are larger than the PME area by comparing a size of the coding units to the size of the PME area;

derive an implicit PME area for particular coding units of the video frame determined to have the size larger than the PME area, the implicit PME area being the size of the particular coding units; perform a motion vector prediction process to determine motion vectors for coding units of the video frame having a size smaller than or equal to the PME area using PME candidate list construction process and the PME area, the PME area being an area of a video frame in which motion estimation is performed in parallel;

perform the motion vector prediction process to determine motion vectors for coding units of the video frame having the size larger than the PME area using the PME candidate list construction process and the implicit PME area;

perform the PME candidate list construction process on the video frame, wherein the PME candidate list construction process removes inter coding unit dependencies in a motion vector candidate list for the motion vector prediction process, and wherein the instructions further cause the one or more processors to:

determine if a candidate block is within the PME area or the implicit PME area; in the case that the candidate block is within the PME area or the implicit PME area, not add the candidate block to the motion vector candidate list; and in the case that the candidate block is not within the PME area or the implicit PME area, add the candidate block to the motion vector candidate list;

encode the video frame using the determined motion vectors;

signal the encoded video frame; and signal an indication of the size of the PME area.

36. The non-transitory computer-readable storage medium of claim 35, wherein the implicit PME area is equal to the size of a particular coding unit having the size larger than the PME area.

37. The method of claim 1, the method being executable on a wireless communication device, wherein the wireless communication device comprises:
   a memory configured to store the video data;
   a processor configured to execute instructions to perform the motion vector prediction process on the video data stored in the memory; and
   a receiver configured to receive the video data and the indication of the size of the PME area.

38. The method of claim 37, wherein the wireless communication device is a cellular telephone and the video data and the indication of the size of the PME area are received by the receiver and modulated according to a cellular communication standard.

39. The apparatus of claim 15, wherein the apparatus is a wireless communication device, further comprising:
   a receiver configured to receive the video data and the indication of the size of the PME area.

40. The apparatus of claim 39, wherein the wireless communication device is a cellular telephone and the video data and the indication of the size of the PME area are received by the receiver and modulated according to a cellular communication standard.

* * * * *